US008939023B2

(12) United States Patent
Jeung et al.

(10) Patent No.: US 8,939,023 B2
(45) Date of Patent: Jan. 27, 2015

(54) INERTIAL SENSOR

(75) Inventors: Won Kyu Jeung, Seoul (KR); Ho Seop Jeong, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 450 days.

(21) Appl. No.: 13/227,305

(22) Filed: Sep. 7, 2011

(65) Prior Publication Data

US 2012/0272734 A1 Nov. 1, 2012

(30) Foreign Application Priority Data

Apr. 27, 2011 (KR) .................. 10-2011-0039427

(51) Int. Cl.
| G01C 19/56 | (2012.01) |
| G01C 19/5755 | (2012.01) |
| G01P 15/08 | (2006.01) |
| G01P 15/09 | (2006.01) |

(52) U.S. Cl.
CPC ........ *G01C 19/5755* (2013.01); *G01P 15/0802* (2013.01); *G01P 15/09* (2013.01); *G01P 2015/0837* (2013.01)
USPC ....................................... 73/504.12

(58) Field of Classification Search
CPC ....................................................... G01C 19/56
USPC .............. 73/504.12, 514.01, 514.13, 514.34, 73/514.38
See application file for complete search history.

(56) References Cited

U.S. PATENT DOCUMENTS

| 6,282,956 B1 * | 9/2001 | Okada ......................... 73/504.12 |
| 6,946,695 B2 * | 9/2005 | Schiller ....................... 73/514.34 |
| 2008/0034868 A1 * | 2/2008 | Nakatani et al. ........... 73/514.33 |
| 2012/0297874 A1 * | 11/2012 | Kim et al. .................. 73/504.12 |

* cited by examiner

*Primary Examiner* — John Chapman, Jr.
(74) *Attorney, Agent, or Firm* — Ladas Parry, LLP

(57) ABSTRACT

Disclosed herein is an inertial sensor. An inertial sensor 100 according to a preferred embodiment of the present invention is configured to include a plate-shaped membrane 110 on which a hole 200 penetrating in a thickness direction is formed, a mass body 120 disposed on a bottom of a central portion 113 of the membrane 110, and a post 130 disposed on a bottom of an edge 115 of the membrane 110 to support the membrane 110 and surrounding the mass body 120. By the configuration, the preferred embodiment of the present invention reduces damping force due to viscosity of air at the time of vibration by forming the hole 200 on the membrane 110 to increase displacement or amplitude of the mass body 120, thereby increasing sensitivity of the inertial sensor 100.

10 Claims, 9 Drawing Sheets

INERTIAL SENSOR

CROSS REFERENCE TO RELATED APPLICATION

This application claims the benefit of Korean Patent Application No. 10-2011-0039427, filed on Apr. 27, 2011, entitled "Inertial Sensor" which is hereby incorporated by reference in its entirety into this application.

BACKGROUND OF THE INVENTION

1. Technical Field

The present invention relates to an inertial sensor.

2. Description of the Related Art

Recently, an inertial sensor has been used in various fields, for example, the military, such as an artificial satellite, a missile, an unmanned aircraft, or the like, vehicles, such as an air bag, electronic stability control (ESC), a black box for a vehicle, or the like, hand shaking prevention of a camcorder, motion sensing of a mobile phone or a game machine, navigation, or the like, The inertial sensor generally adopts a configuration in which a mass body is bonded to a flexible substrate such as a membrane, or the like, so as to measure acceleration and angular velocity. Through the configuration, the inertial sensor may calculate the acceleration by measuring inertial force applied to the mass body and may calculate the angular velocity by measuring Coriolis force applied to the mass body.

A process of measuring the acceleration and the angular velocity by using the inertial sensor will be described in detail below. First, the acceleration may be obtained by Newton's law of motion "F=ma", where "F" represents inertial force applied to the mass body, "m" represents a mass of the mass body, and "a" is acceleration to be measured. Therefore, the acceleration a may be obtained by measuring the inertial force F applied to the mass body and dividing the measured inertial force F by the mass m of the mass body that is a predetermined value. Meanwhile, the angular velocity may be obtained by Coriolis force "F=2 mΩ·v", where "F" represents the Coriolis force applied to the mass body, "m" represents the mass of the mass body, "Ω" represents the angular velocity to be measured, and "v" represents the motion velocity of the mass body. Among others, since the motion velocity v of the mass body and the mass m of the mass body are values that are known in advance, the angular velocity Ω may be obtained by measuring the Coriolis force (F) applied to the mass body.

As described above, in order to measure the angular velocity Ω using the Coriolis force F, the mass body needs to be vibrated at a predetermined motion velocity v. However, when the mass body is vibrated, the inertial sensor according to the prior art may have a small amplitude and thus, sensitivity of a sensor may be degraded, due to damping force of air to a membrane. In addition, in order to implement the desired amplitude, the power consumption may be increased when the driving voltage is increased.

In order to solve the above problems, a technology of packaging the inertial sensor by depressurization or vacuum has been developed. However, in order to maintain the depressurization or the vacuum, a rigid encapsulation structure is needed and thus, manufacturing costs of the inertial sensor may be increased. In addition, since the complete sealing structure cannot be practically implemented, the sensitivity of the inertial sensor may be gradually degraded due to the introduction of air into the inertial sensor over time.

SUMMARY OF THE INVENTION

The present invention has been made in an effort to provide an inertial sensor capable of reducing damping force due to viscosity of air at the time of vibration by faulting a hole on a membrane.

According to a preferred embodiment of the present invention, there is provided an inertial sensor, including: a plate-shaped membrane on which a hole penetrating in a thickness direction is formed; a mass body that is disposed at a bottom of a central portion of the membrane; and a post that is disposed at a bottom of an edge of the membrane to support the membrane and surrounds the mass body.

The hole may have a transverse section in a circular shape or a polygonal shape.

The hole may be disposed at an outer side of the central portion of the membrane on which the mass body is disposed.

The inertial sensor may further include: a driving unit that is disposed on the membrane to generate vibrations at the central portion of the membrane; and a sensing unit that is disposed on the membrane and senses force applied to the central portion of the membrane.

The driving unit and the sensing unit may be disposed on one surface of the membrane, the driving unit may include a piezoelectric material and driving electrodes formed on the piezoelectric material, and the sensing unit may include the piezoelectric material and sensing electrodes formed on the piezoelectric material.

The piezoelectric material may be partitioned into an inner annular region surrounding a center of the membrane and an outer annular region surrounding the inner annular region, the driving electrodes divided into N may be formed in the outer annular region in an arc shape, and the sensing electrodes divided into M may be formed in the inner annular region in an arc shape.

The hole may be formed between the adjacent driving electrodes among the driving electrodes divided into N.

The hole may be formed between the adjacent sensing electrodes among the sensing electrodes divided into M.

The piezoelectric material may be partitioned into the inner annular regions surrounding the center of the membrane and the outer annular region surrounding the inner annular region, the driving electrodes divided into N may be formed in the inner annular region in an arc shape, and the sensing electrodes divided into M may be formed in the outer annular region in an arc shape.

The hole may be formed between the adjacent driving electrodes among the driving electrodes divided into N.

The hole may be formed between the adjacent sensing electrodes among the sensing electrodes divided into M.

The piezoelectric material may be formed on a whole surface of the membrane and the piezoelectric material may be provided with the hole extendedly formed.

The inertial sensor may further include an adhesive layer including: a mass body adhesive layer that bonds the mass body to a bottom of the central portion of the membrane; and a post adhesive layer that bonds the post to a bottom of an edge of the membrane.

The mass body may be formed in a cylindrical shape.

The post may be formed in a square pillar in which a cavity in a cylindrical shape is formed at a center thereof.

The inertial sensor may further include a bottom cap that is spaced away from the mass body and is disposed at the bottom of the post so as to encapsulate the bottom of the post.

The inertial sensor may further include a top cap that is spaced away from the central portion of the membrane and is disposed on the top of the membrane so as to form an empty space with the membrane.

DESCRIPTION OF THE PREFERRED EMBODIMENTS

Figure 1:
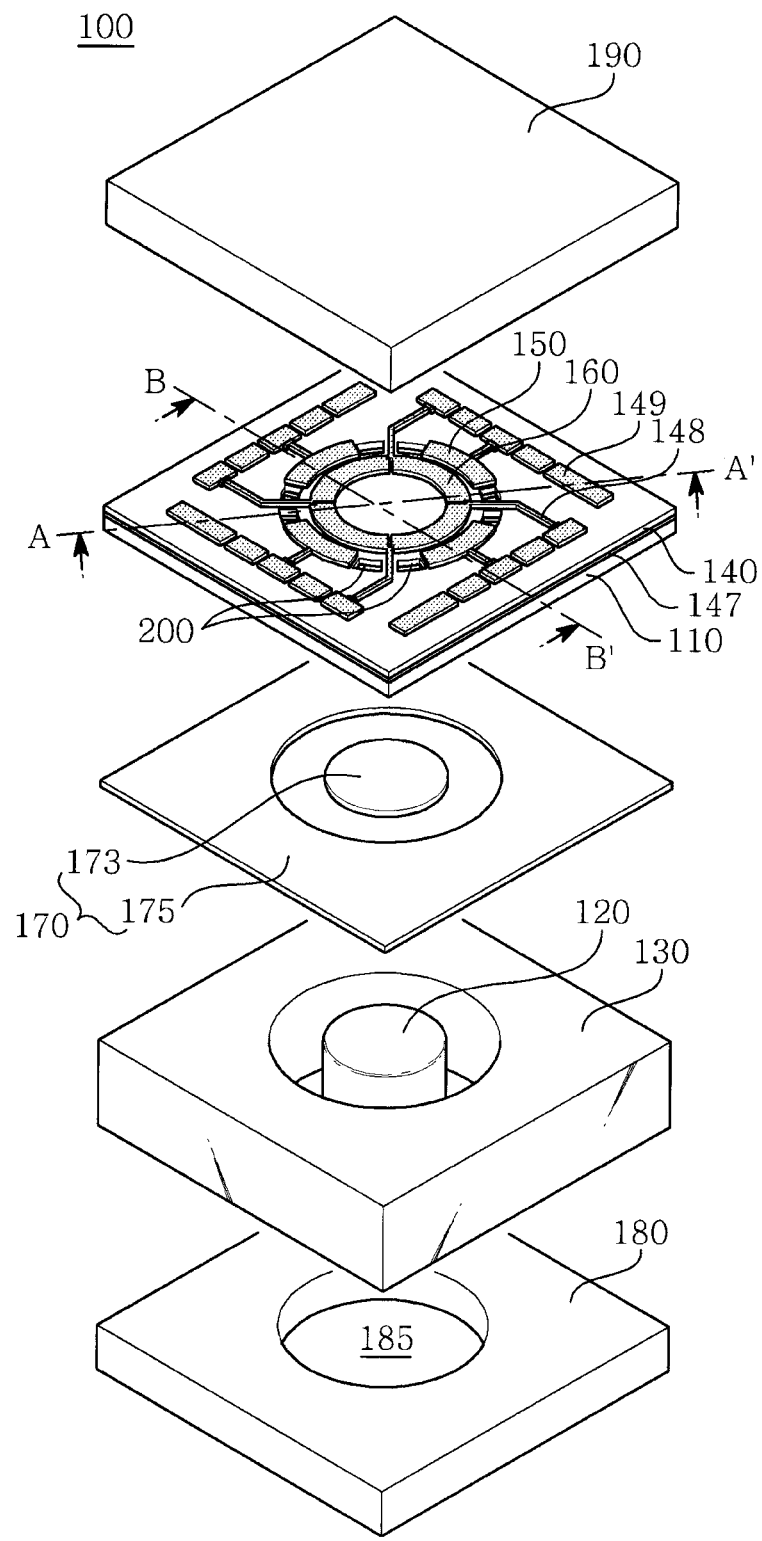
FIG. 1 is an exploded perspective view of the inertial sensor according to a preferred embodiment of the present invention.

Various features and advantages of the present invention will become apparent from the following description of embodiments with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

The above and other objects, features and advantages of the present invention will be more clearly understood from the following detailed description taken in conjunction with the accompanying drawings. In the specification, in adding reference numerals to components throughout the drawings, it is to be noted that like reference numerals designate like components even though components are shown in different drawings. Terms used in the specification, 'first', 'second', etc. can be used to describe various components, but the components are not to be construed as being limited to the terms. The terms are only used to differentiate one component from other components. Further, when it is determined that the detailed description of the known art related to the present invention may obscure the gist of the present invention, the detailed description thereof will be omitted.

Hereinafter, the preferred embodiments of the present invention will be described in detail with reference to the accompanying drawings.

Figure 2:
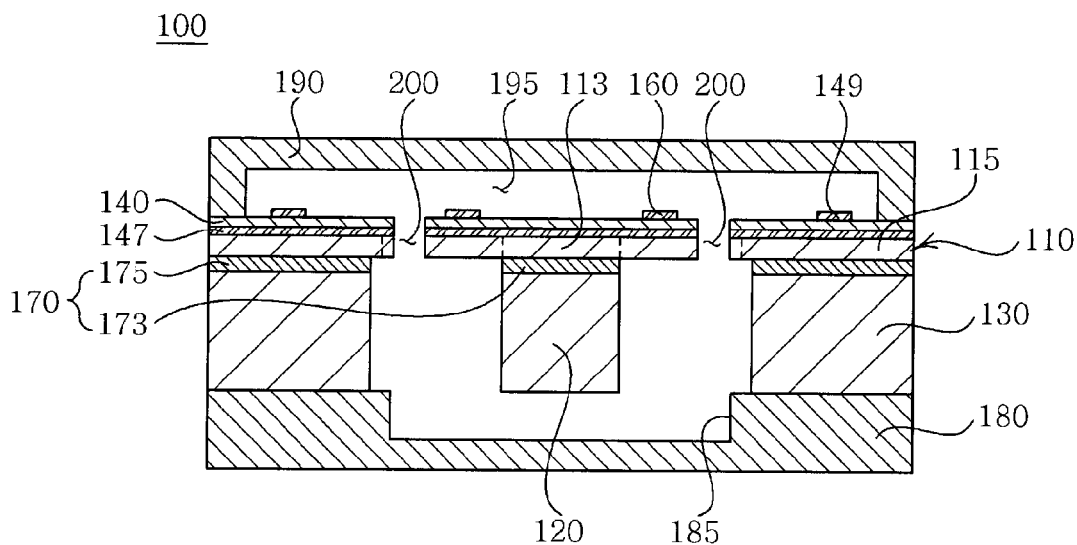
FIG. 2 is a cross-sectional view of the inertial sensor shown in FIG. 1 taken along line A-A'.
Figure 3:
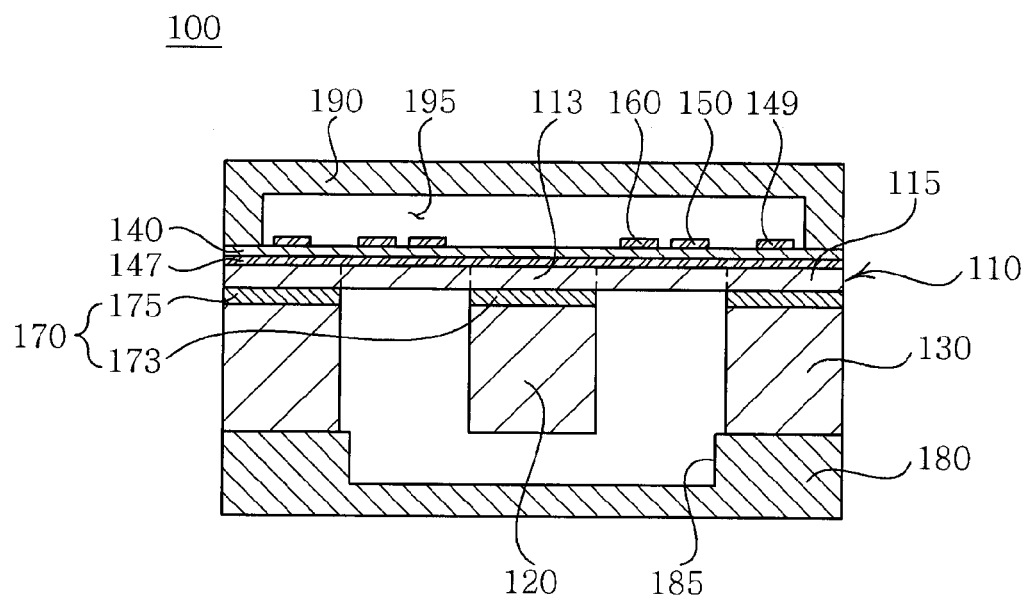
FIG. 3 is a cross-sectional view of the inertial sensor shown in FIG. 1 taken along line B-B'.

FIG. 1 is an exploded perspective view of the inertial sensor according to a preferred embodiment of the present invention, FIG. 2 is a cross-sectional view of the inertial sensor shown in FIG. 1 taken along line A-A, and FIG. 3 is a cross-sectional view of the inertial sensor shown in FIG. 1 taken along line B-B'.

As shown in FIGS. 1 to 3, an inertial sensor 100 according to a preferred embodiment of the present invention is configured to include a plate-shaped membrane 110 on which a hole 200 penetrating in a thickness direction is formed, a mass body 120 disposed on a bottom of a central portion 113 of the membrane 110, and a post 130 disposed on a bottom of an edge 115 of the membrane 110 to support the membrane 110 and surrounding the mass body 120.

The membrane 110 is formed in a plate shape and has elasticity so as to vibrate the mass body 120. In this configuration, a boundary of the membrane 110 is not clearly differentiated, but may be partitioned by the central portion 113 of the membrane 110 and the edge 115 disposed along an outer side of the membrane 110 as shown in FIGS. 2 and 3. In detail, the bottom portion of the central portion 113 of the membrane 110 is provided with the mass body 120, such that the central portion is displaced in response to the motion of the mass body 120. In addition, the bottom portion of the edge 115 of the membrane 110 is provided with the post 130 to serve to support the central portion 113 of the membrane 110. Meanwhile, since the elastic deformation is made between the central portion 113 and the edge 115 of the membrane 110, a driving unit is disposed therebetween to vibrate the mass body 120 or a sensing unit is disposed therebetween to measure a displacement of the mass body 120. However, the driving unit and the sensing unit are not necessarily disposed between the central portion 113 and the edge 115 of the membrane 110 and some thereof may be disposed at the central portion 113 or the edge 115 of the membrane 110.

Figure 4:
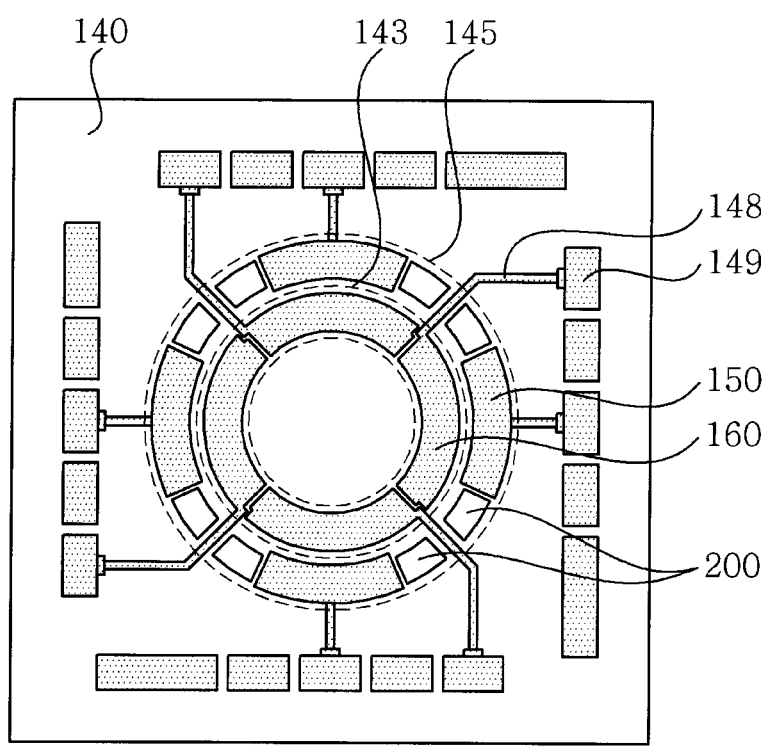
FIG. 4 is a plan view of the inertial sensor shown in FIG. 1 of which the top cap is removed.
Figure 5:
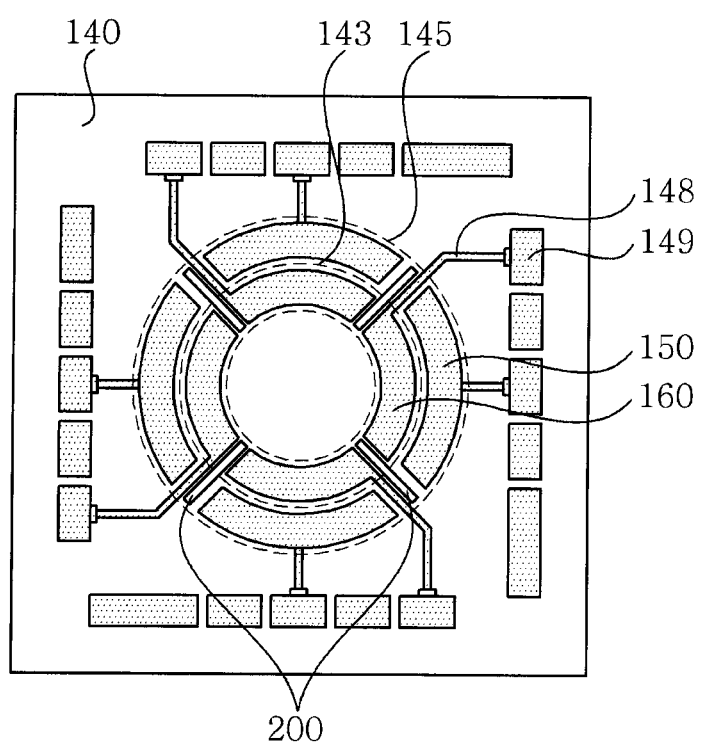
FIGS. 5 to 7 are plan views showing a modified example of the inertial sensor shown in FIG. 4.
Figure 6:
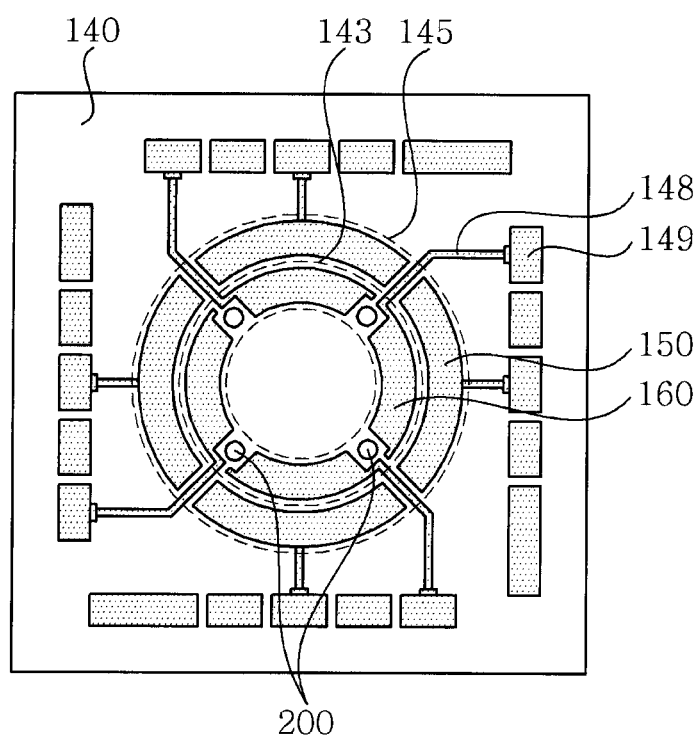
Figure 7:
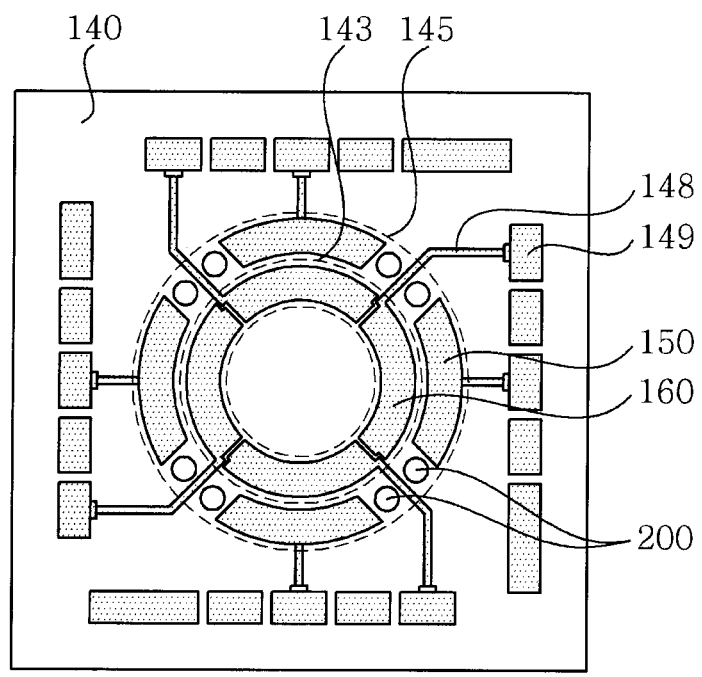

FIG. 4 is a plan view of the inertial sensor shown in FIG. 1 of which the top cap is removed and FIGS. 5 to 7 are plan views showing a modified example of the inertial sensor shown in FIG. 4.

As shown in FIGS. 4 to 7, the driving unit and the sensing unit may be implemented by forming a plurality of electrodes in a plate-shaped structure on a single piezoelectric material 140. For example, the driving unit may be implemented by forming the driving electrodes 150 on a top of the piezoelectric material 140 and the sensing unit may be implemented by forming the sensing electrodes 160 on the top of the piezoelectric material 140. In this configuration, the driving electrode 150 and the sensing electrode 160 are each formed in an arc shape. In more detail, when the piezoelectric material 140 is partitioned into an inner annular region 143 surrounding the center of the membrane 110 and an outer annular region 145 surrounding the inner annular region 143, the driving electrode 150 may be formed in the outer annular region 145 in an arc shape and the sensing electrode 160 may be formed in the inner annular region 143 in an arc shape. In this case, the driving electrode 150 may be formed by being divided into N and the sensing electrode 160 may be formed by being divided into M. In the drawings, the driving electrode 150 and the sensing electrode 160 are each formed by being divided into 4, but are not necessarily limited thereto. The number of driving electrodes 150 and sensing electrodes 160 may be determined in consideration of the manufacturing costs and the sensitivity to be implemented.

Meanwhile, the driving electrode 150 and the sensing electrode 160 are electrically connected to a pad 149 through a connection pattern 148. Finally, the pads 149 are electrically connected to an external circuit such as a printed circuit board, or the like.

Figure 8:
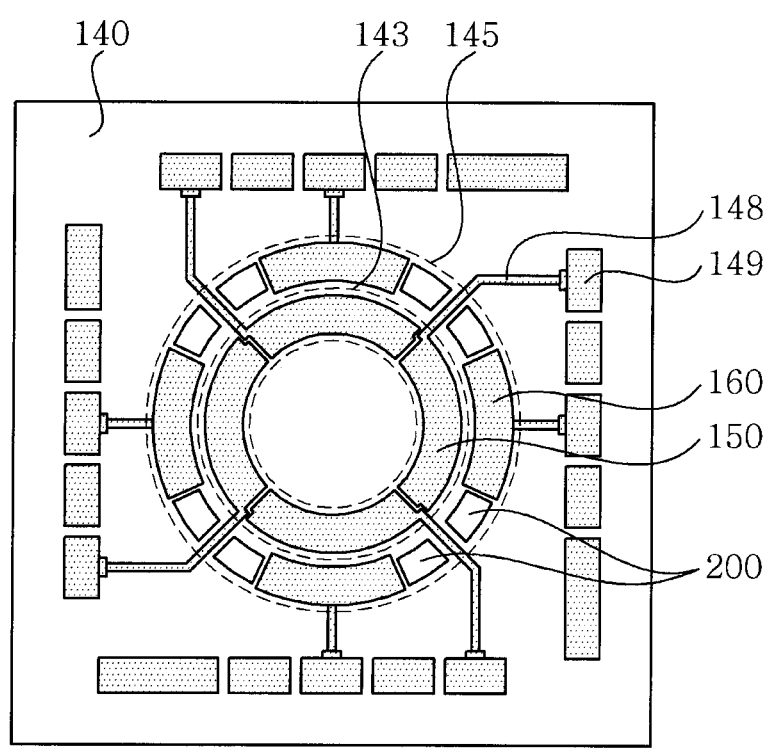
FIG. 8 is a plan view showing a modified example in which driving electrodes and sensing electrodes of the inertial sensor shown in FIG. 4 are shown.

In addition, FIG. 8 is a plan view showing a modified example in which the position of the driving electrode and the sensing electrode of the inertial sensor shown in FIG. 4 is changed to each other. In the inertial sensor 100 shown in FIG. 8, the position of the driving electrode 150 and the sensing electrode 160 is changed to each other, as compared with the inertial sensor 100 shown in FIG. 4. That is, the driving electrode 150 may be formed in the inner annular region 143 in an arc shape and the sensing electrode 160 may be formed in the outer annular region 145 in an arc shape. The change in the position of the driving electrode 150 and the sensing electrode 160 may also be similarly applied to the driving electrode 150 and the sensing electrode 160 of the inertial sensor 100 shown in FIGS. 5 to 7.

FIGS. 2 and 3 show that the bottom of the piezoelectric material 140 is provided with common electrodes 147; however, the preferred embodiment of the present invention is not necessarily limited thereto. The bottom of the piezoelectric material 140 may also be provided with the driving 150 and the sensing electrode 160, similar to the top of the piezoelectric material 140.

As shown in FIG. 2, a hole 200 penetrating in a thickness direction (which does not necessarily mean a vertical direction to one surface of the membrane) is formed on the membrane 110. In this configuration, the hole 200 serves to freely move air above and under the membrane 110. The air above and under the membrane 110 may freely move through the hole 200, such that damping force of air generated at the time of moving the central portion 113 of the membrane 110 may be reduced. In this configuration, the position of the hole 200 is not particularly limited, but the hole may be formed at the outer side of the central portion 113 of the membrane 110 provided with the mass body 120 so that the air above and under the membrane 110 may be communicated with each other. In addition, when the piezoelectric material 140 and the common electrodes 147 are formed on the whole surface of the membrane 110, the hole 200 formed on the membrane 110 may extend to penetrate through the piezoelectric material 140 and the common electrodes 147. Describing in more detail with reference to FIGS. 4 to 7, in order to maximally prevent the influence on a design of the sensing electrode 160 and the driving electrode 150, the hole 200 is formed between two adjacent driving electrodes 150 among driving electrodes 150 divided into N (see FIGS. 4 and 7) or the hole 200 may be formed between two adjacent sensing electrodes 160 among sensing electrodes 160 divided into M (see FIG. 6). Alternatively, when the driving electrodes 150 and the sensing electrodes 160 are divided into the same number to form similar figures to each other (a size is different but a shape is the same), the hole 200 may extend from between the two adjacent driving electrodes 150 to the two adjacent sensing electrodes 160 (see FIG. 5). In this configuration, a transverse section of the hole 200 is a circular shape (see FIGS. 6 and 7) or a polygonal shape (see FIGS. 4 and 5).

Meanwhile, the hole 200 may be formed by dry etching such as laser, reactive ion etching (RIE), or the like, but the scope of the preferred embodiment of the present invention is not limited thereto. A detailed description of reducing damping force of air by forming the hole 200 on the membrane 110 will be described below.

As shown in FIGS. 1 to 3, the mass body 120 is displaced by inertial force or Coriolis force and is disposed at the bottom of the central portion 113 of the membrane 110. In addition, the post 130 is formed in a hollow shape to support the membrane 110 so as to serve to secure a space in which the mass body 120 may be displaced. The post 130 is disposed at the bottom of the edge 115 of the membrane 110. In this configuration, the mass body 120 may be formed in, for example, a cylindrical shape and the post 130 may be formed in a square pillar in which a cavity in a cylindrical shape is formed at a center thereof. That is, when being viewed from a transverse section, the mass body 120 is formed in a circular shape and the post 130 is formed in a square shape having a circular opening disposed at the center thereof.

Meanwhile, since the mass body 120 is bonded to the central portion 113 of the membrane 110 and the post 130 is bonded to the edge 115 of the membrane 110, a adhesive layer 170 may be disposed between the mass body 120 and the central portion 113 of the membrane 110 and the post 130 and the edge 115 of the membrane 110. In this configuration, the adhesive layer 170 is configured to include a mass body adhesive layer 173 that bonds the central portion 113 of the membrane 110 to the mass body 120 and a post adhesive layer 175 that bonds the edge 115 of the membrane 110 to the post 130. In addition, the mass body adhesive layer 173 and the post adhesive layer 175 may each be formed in a shape corresponding to the mass body 120 and the post 130.

In addition, the bottom of the post 130 may be provided with a bottom cap 180 that encapsulates the bottom of the post 130. In this configuration, the bottom cap 180 serves to protect the bottom of the inertial sensor 100 and a portion corresponding to the mass body 120 of the bottom cap 180 may be provided with a first concave portion 185 so as not to hinder the vibrations of the mass body 120.

Further, the top of the membrane 110 may be provided with a top cap 190 so as to form an empty space with the membrane 110. In this configuration, the top cap 190 serves to protect the top of the inertial sensor 100 and the top of the membrane 110 may be formed with a second concave portion 195 so as not to hinder the vibrations of the membrane 110 when the mass body 120 is vibrated.

Figure 9:
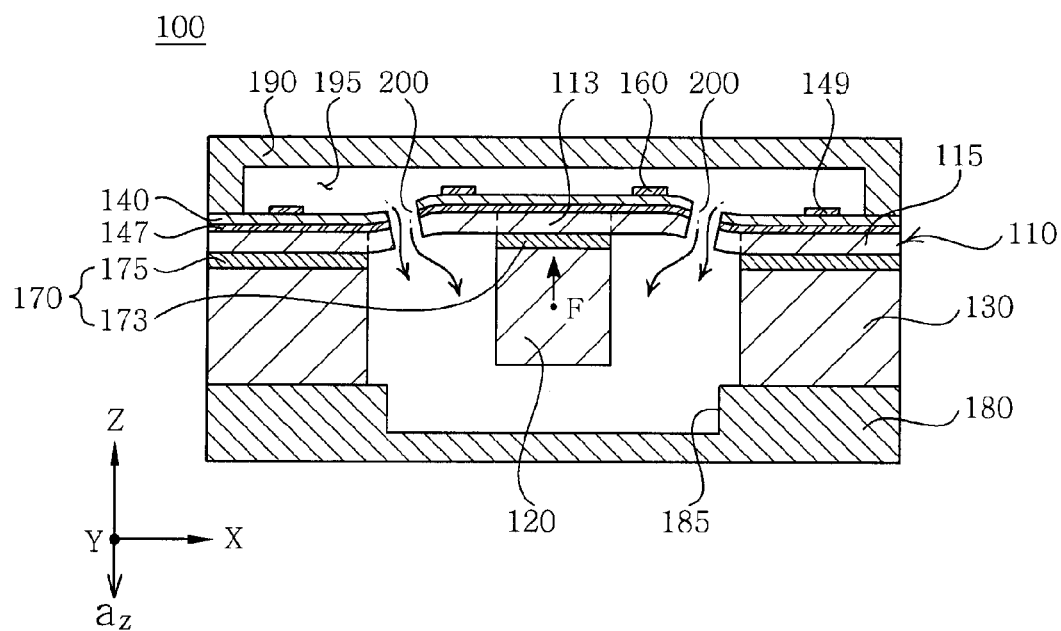
FIG. 9 is a cross-sectional view showing a process of measuring acceleration in a Z-axis direction by the inertial sensor shown in FIG. 2.

FIG. 9 is a cross-sectional view showing a process of measuring acceleration in a Z-axis direction by the inertial sensor shown in FIG. 2.

A process of measuring acceleration $a_z$ in the Z-axis direction will be described with reference to FIG. 9.

When the acceleration $a_z$ is applied to the inertial sensor 100 in the Z-axis direction, the inertial force F is applied to the mass body 120 in an opposite direction to the acceleration $a_z$. The equation of the inertial force F is established as "$F=ma_z$", where "F" represents the inertial force applying to the mass body 120, "m" represents a mass of the mass body 120, and "$a_z$" represent the acceleration to be measured. Among those, since the mass m of the mass body 120 is a value known in advance, the acceleration $a_z$ in the Z-axis direction may be measured at the time of measuring the inertial force F. As described above, when measuring the acceleration $a_z$ in the Z-axis direction, the mass body 120 is displaced in the Z-axis direction by the inertial force F. In this case, when the membrane 110 is also displaced in the Z-axis direction, the inertial sensor 100 according to the preferred embodiment of the present invention may reduce the damping force of air that is present above and under the membrane 110 by forming the hole 200 on the membrane 110. In detail, as shown in FIG. 9, when the membrane 110 moves in a +z-axis direction, the air present above the membrane 110 moves under the membrane 110 through the hole 200 (see an arrow). As described above, the air is freely moved above and under the membrane 110 according to the displacement of the membrane 110, such that the damping force of air may be reduced and thus, the displacement of the mass body 120 is increased, thereby improving the sensitivity of the inertial sensor 100.

FIG. 10 is a cross-sectional view showing a process of vibrating a mass body in a Z-axis direction so as to measure angular velocity rotating based on an X axis by the inertial sensor shown in FIG. 2.

In order to measure the angular velocity, there is a need to vibrate the mass body 120 in a vertical direction to a reference axis of the angular velocity. For example, a process of measuring rotating angular velocity ΩX based on the X axis will be described below with reference to FIG. 10.

Figure 10A:
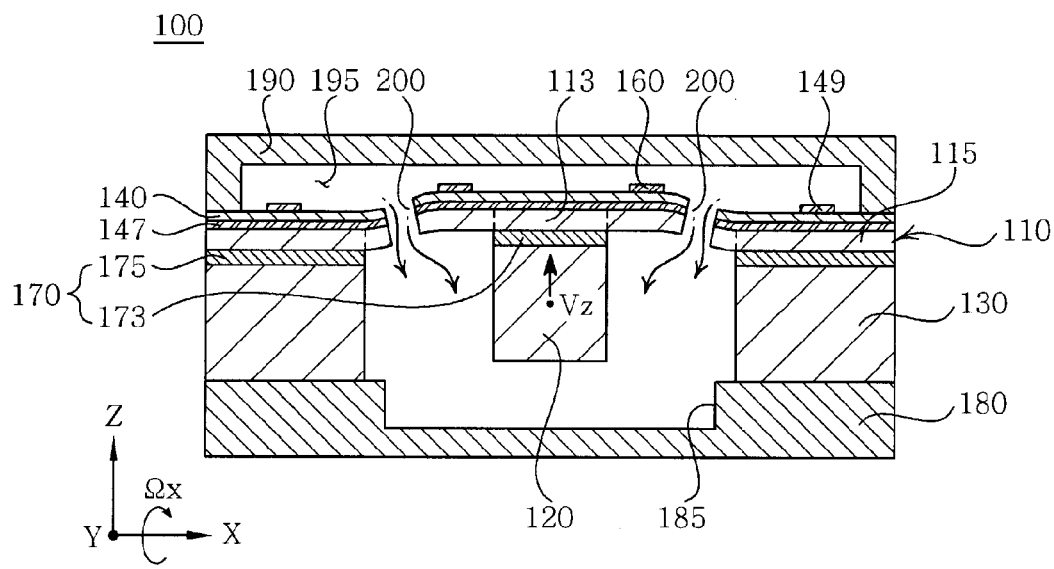
FIGS. 10A and 10B are a cross-sectional view showing a process of vibrating a mass body in a Z-axis direction so as to measure angular velocity rotating based on an X axis by the inertial sensor shown in FIG. 2.
Figure 10B:
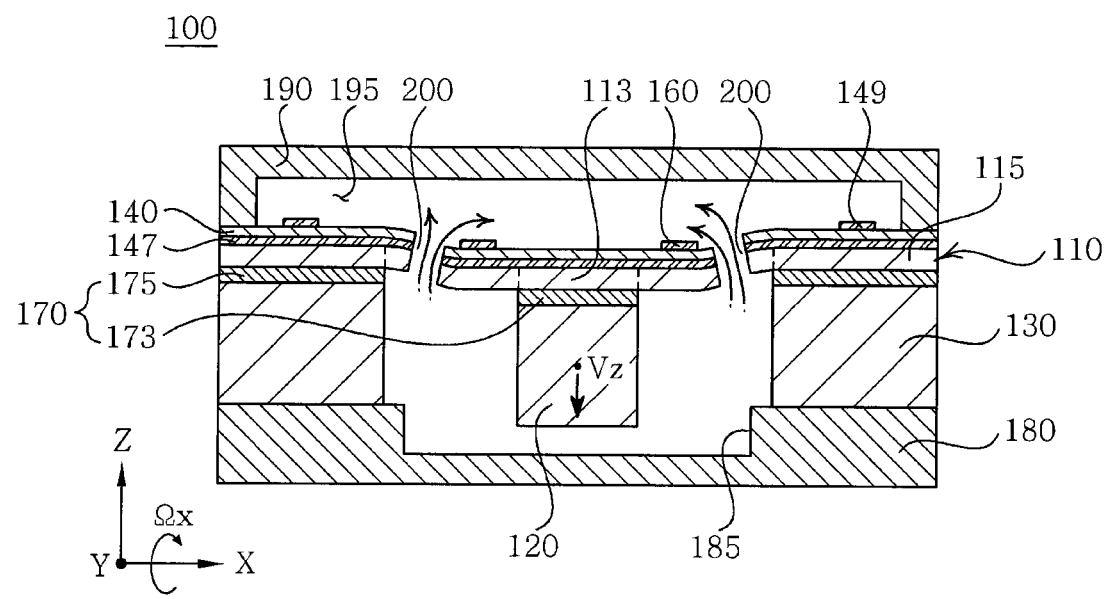

In order to generate the Coriolis force F so as to measure the angular velocity ΩX rotating based on the X axis, the inertial sensor 100 needs to vibrate the mass body 120 in the Z-axis direction (0→$V_z$). The Coriolis force F may be obtained by equation "$F=2 m\Omega_X \cdot V_Z$", where "F" represents the Coriolis force applied to the mass body 120, "m" represents the mass of the mass body 120, "$\Omega_X$" represents the angular velocity to be measured, and "$V_Z$" represents the vibration velocity of the mass body 120. Among others, since the mass m of the mass body 120 and the vibration velocity $V_z$ of the mass body 120 are values known in advance, the angular velocity $\Omega_X$ rotating based on the X axis may be measured when the Coriolis force F is measured. As described above, in order to measure the angular velocity, there is a need to vibrate the mass body 120 in a vertical direction to the reference axis of the angular velocity. As described above, when the mass body 120 is vibrated in the Z-axis direction, the membrane 110 is also vibrated in the Z-axis direction. In this case, in the inertial sensor according to the prior art, the amplitude is affected by the viscosity of air present above and under the membrane. However, the inertial sensor 100 according to the preferred embodiment of the present invention may reduce the damping force of air by forming the hole 200 on the membrane 110. In detail, as shown in FIG. 10A, when the membrane 110 moves in the +Z-axis direction, the air present at the top of the membrane 110 moves under the membrane 110 through the hole 200 and as shown in FIG. 10B, when the membrane 110 moves in the −Z-axis direction, the air present at the bottom of the membrane 110 moves to the top of the membrane 110 through the hole 200 (see an arrow). As described above, the air is freely moved above and under the membrane 110 according to the vibrations of the membrane 110, such that the damping force of air may be reduced and thus, the amplitude of the mass body 120 is increased, thereby improving the sensitivity of the inertial sensor 100. In addition, the inertial sensor according to the preferred embodiment of the present invention may vibrate the mass body 120 at the desired amplitude by the relatively smaller driving voltage than the inertial sensor according to the related art, thereby reducing the power consumption. Meanwhile, these effects may be similarly implemented during the process of measuring the angular velocity $\Omega_Y$ rotating based on the Y axis.

TABLE 1

| Kind of hole | Q-factor (Z-axis direction) |
| --- | --- |
| Prior art (no hole formation) | 50 to 150 |
| Hole of FIG. 4 | 272 |
| Hole of FIG. 5 | 206 |
| Hole of FIG. 6 | 155 |
| Hole of FIG. 7 | 188 |

Results of measuring a degree of reduction in the damping force of air by forming various types of holes 200 on the membrane 110 are shown in the above Table 1. As shown in the above Table 1, when various types of holes are formed in the membrane 110, it can be appreciated that the quality factor (Q-factor) in the Z-axis direction is increased as compared with the case in which the hole 200 is not formed in the membrane 110. In this case, the Q-factor is inversely proportionate to the damping force of air. Therefore, the increase in the Q-factor in the Z-axis direction by forming the hole 200 on the membrane 110 means that the damping force of air is reduced. As a result, when the hole 200 is formed on the membrane 110 by the measurement results, it can be appreciated that the damping force of air is reduced.

Further, the preferred embodiment of the present invention may control the resonance frequency of the inertial sensor 100 about the XYZ axes and prevent the resonance frequencies about the XYZ axes from being coupled to each other control by forming the hole 200 on the membrane 100 to deform the physical property of the membrane 110 (mechanical property). That is, even though the same membrane 110 is used, it is possible to prevent the resonance frequency of the inertial sensor 100 about the XYZ axes from being deformed or the resonance frequencies about the XYZ axes from being coupled with each other according to the formation position or the size of the hole 200. Therefore, in manufacturing the inertial sensor 100, a freedom in design can be improved and the size of the inertial sensor 100 can be reduced though various designs.

As set forth above, the preferred embodiments of the present invention can form the holes in the membrane to reduce the damping force due to the viscosity of air at the time of the vibration to increase the displacement or the amplitude of the mass body, thereby increasing the sensitivity of the inertial sensor.

In addition, the preferred embodiments of the present invention can implement the desired amplitude by the relatively small driving voltage at the time of the vibration as compared to the prior art, thereby reducing the power consumption.

In addition, the preferred embodiments of the present invention can control the resonance frequency of the inertial sensor about the XYZ axes according to the formation position or the size of the hole and prevent the resonance frequencies about the XYZ axes from being coupled to each other even though the same membrane is used, by forming the hole on the membrane to deform the physical property of the membrane (mechanical property, or the like).

Although the embodiment of the present invention has been disclosed for illustrative purposes, it will be appreciated that an inertial sensor according to the invention is not limited thereby, and those skilled in the art will appreciate that various modifications, additions and substitutions are possible, without departing from the scope and spirit of the invention. Accordingly, any and all modifications, variations or equivalent arrangements should be considered to be within the scope of the invention, and the detailed scope of the invention will be disclosed by the accompanying claims.

What is claimed is:

1. An inertial sensor, comprising:
    a plate-shaped membrane on which a hole penetrating in a thickness direction is formed;
    a mass body that is disposed at the membrane; and
    a post that is disposed at the membrane to support the membrane;
    a driving unit disposed on the membrane,
    wherein a piezoelectric material, driving electrodes and sensing electrodes are disposed on one surface of the membrane,
    the piezoelectric material is partitioned into a first annular region surrounding a center of the membrane and a second annular region surrounding the first annular region,
    the driving electrodes divided into annular regions in an arc shape are formed in the second annular region,
    the sensing electrodes divided into annular regions in an arc shape are formed in the first annular region, and
    the hole is formed between at least two driving electrodes or at least two sensing electrodes.

2. The inertial sensor as set forth in claim 1, wherein the hole has a transverse section in a circular shape or a polygonal shape.

3. The inertial sensor as set forth in claim 1, wherein the hole is disposed at an outer side of the central portion of the membrane on which the mass body is disposed.

4. The inertial sensor as set forth in claim 1, wherein the mass body is disposed at a bottom of a central portion of the membrane, the driving unit that is disposed on the membrane to generate vibrations at the central portion of the membrane; and wherein the sensing unit is disposed on the membrane and senses force applied to the central portion of the membrane.

5. The inertial sensor as set forth in claim 1, further comprising an adhesive layer including:

a mass body adhesive layer that bonds the mass body to a bottom of the central portion of the membrane; and a post adhesive layer that bonds the post to a bottom of an edge of the membrane.

6. The inertial sensor as set forth in claim 1, wherein the mass body is formed in a cylindrical shape.

7. The inertial sensor as set forth in claim 1, wherein the post is formed in a square pillar in which a cavity in a cylindrical shape is formed at a center thereof.

8. The inertial sensor as set forth in claim 1, further comprising a bottom cap that is spaced away from the mass body and is disposed at the bottom of the post so as to encapsulate the bottom of the post.

9. The inertial sensor as set forth in claim 1, further comprising a top cap that is spaced away from the central portion of the membrane and is disposed on the top of the membrane so as to form an empty space with the membrane.

10. An inertial sensor, comprising:

a plate-shaped membrane on which a hole penetrating in a thickness direction is formed;

a mass body that is disposed at the membrane; and a post that is disposed at the membrane to support the membrane, wherein a piezoelectric material, driving electrodes and sensing electrodes are disposed on one surface of the membrane, the piezoelectric material is partitioned into a first annular region surrounding a center of the membrane and a second annular region surrounding the first annular region, the sensing electrodes divided into annular regions in an arc shape are formed in the second annular region, the driving electrodes divided into annular regions in an arc shape are formed in the first annular region, and the hole is formed between at least two driving electrodes or at least two sensing electrodes.

\* \* \* \* \*